US012235915B1

(12) United States Patent
McCuskey

(10) Patent No.: US 12,235,915 B1
(45) Date of Patent: Feb. 25, 2025

(54) SYSTEM AND METHOD FOR EVENT-BASED SEARCHING ON SOCIAL MEDIA

(71) Applicant: WHAT'SCOMMON, INC., Boardman, OH (US)

(72) Inventor: Scott A. McCuskey, Boardman, OH (US)

(73) Assignee: WHAT'SCOMMON, INC., Boardman, OH (US)

( * ) Notice: Subject to any disclaimer, the term of this patent is extended or adjusted under 35 U.S.C. 154(b) by 0 days.

(21) Appl. No.: 17/887,594

(22) Filed: Aug. 15, 2022

Related U.S. Application Data

(63) Continuation of application No. 16/119,042, filed on Aug. 31, 2018, now Pat. No. 11,449,561.

(60) Provisional application No. 62/552,950, filed on Aug. 31, 2017.

(51) Int. Cl.
*G06F 16/9535* (2019.01)
*G06F 16/9537* (2019.01)
*H04L 51/52* (2022.01)
*H04L 67/53* (2022.01)

(52) U.S. Cl.
CPC ...... *G06F 16/9535* (2019.01); *G06F 16/9537* (2019.01); *H04L 51/52* (2022.05); *H04L 67/53* (2022.05)

(58) Field of Classification Search
None
See application file for complete search history.

(56) References Cited

U.S. PATENT DOCUMENTS

| | | | |
|---|---|---|---|
| 9,118,724 B1* | 8/2015 | Sooriyan | H04W 4/21 |
| 10,257,291 B1* | 4/2019 | Matiash | H04L 67/535 |
| 2014/0040368 A1* | 2/2014 | Janssens | H04L 67/306 |
| | | | 709/204 |
| 2015/0234939 A1* | 8/2015 | Aharony | G06F 16/9537 |
| | | | 707/754 |
| 2015/0341452 A1* | 11/2015 | Li | G06Q 50/01 |
| | | | 709/204 |
| 2016/0189260 A1* | 6/2016 | Nagla | G06Q 30/0611 |
| | | | 705/26.4 |
| 2018/0069937 A1* | 3/2018 | Kolleri | H04L 67/535 |
| 2018/0121828 A1* | 5/2018 | Keysers | G06N 5/04 |

* cited by examiner

*Primary Examiner* — Natisha D Cox
(74) *Attorney, Agent, or Firm* — Frost Brown Todd LLP

(57) ABSTRACT

An event-based social media search platform includes a database for storing event data associated with user-created events for a plurality of users. The platform analyzes event data from different user-created events to determine when user-created events have event data in common. The platform alerts associated users of related events and facilitates communications between users to confirm that the user-created events are the same or related events. The platform can associate event data and users of related events in the database. Events can be published via social media platforms to assist users in finding other users who share common events.

20 Claims, 14 Drawing Sheets

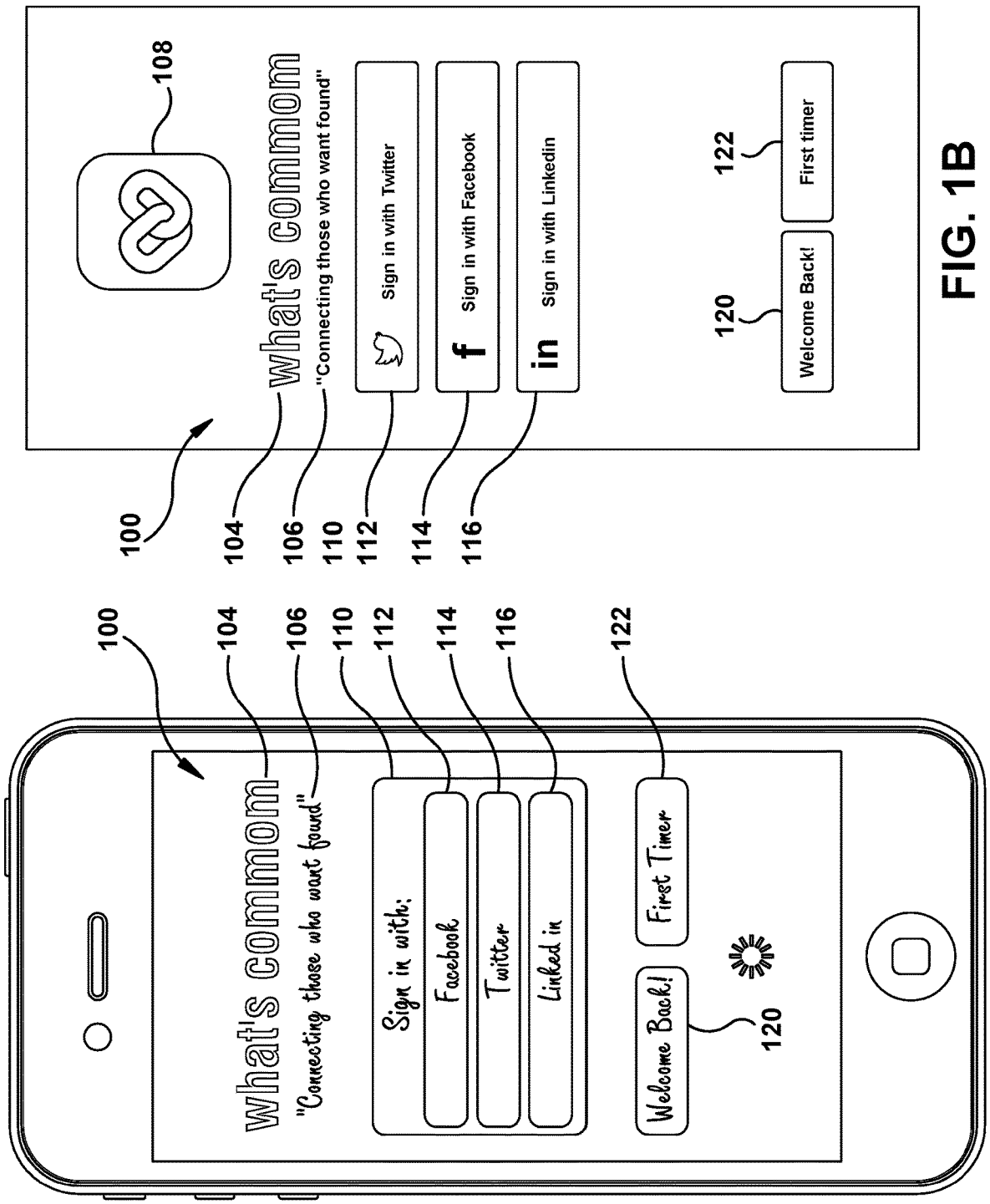

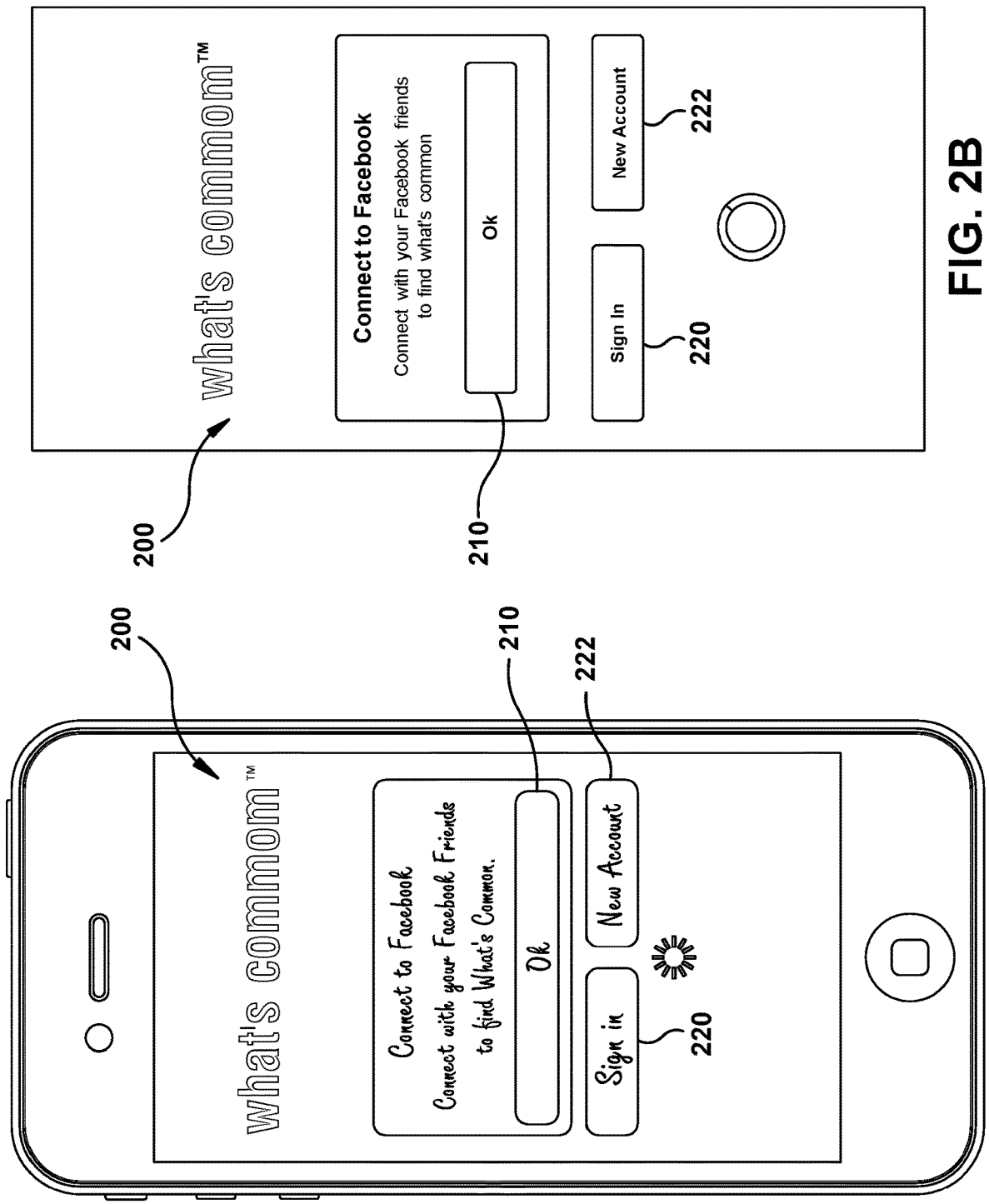

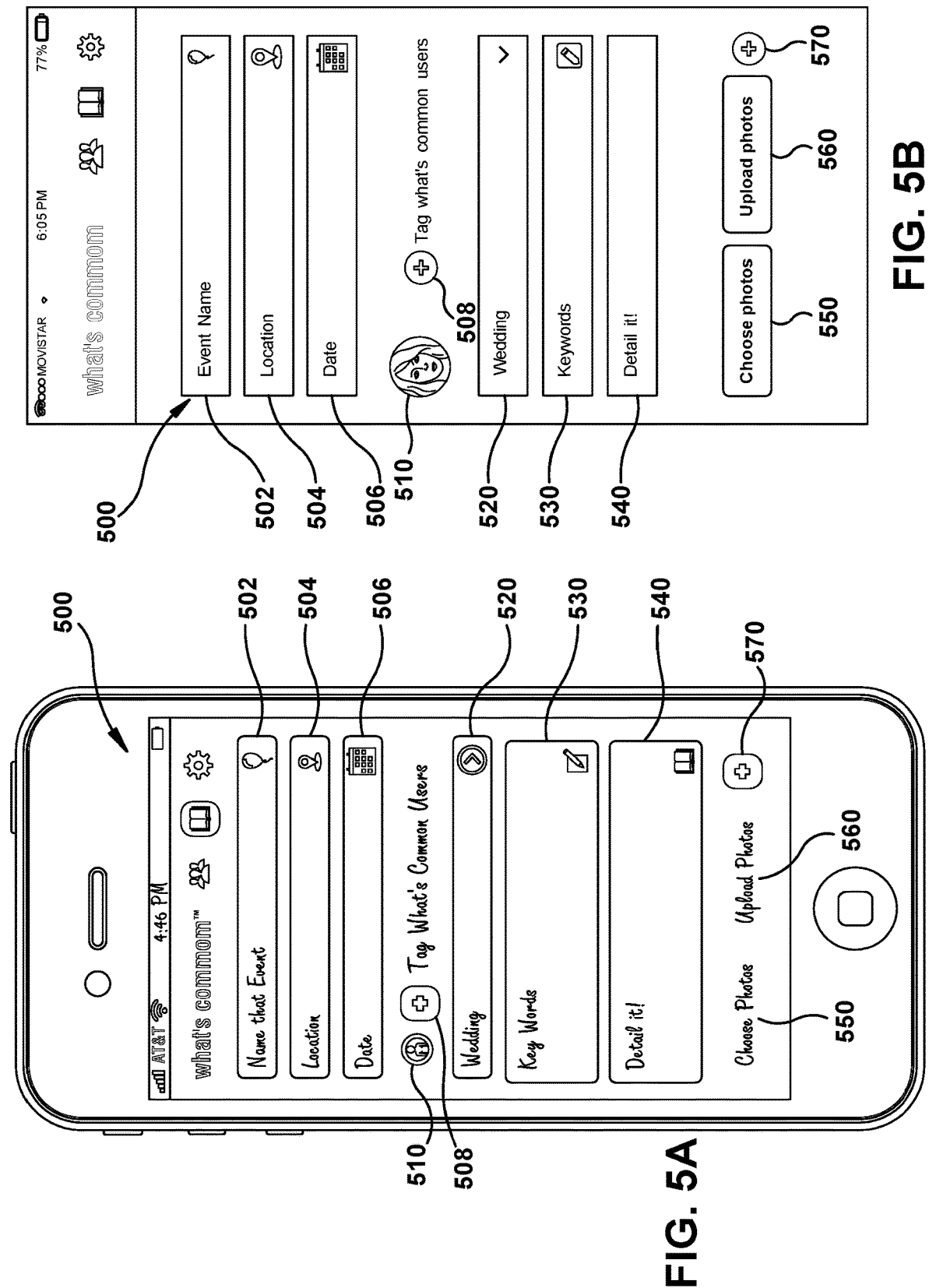

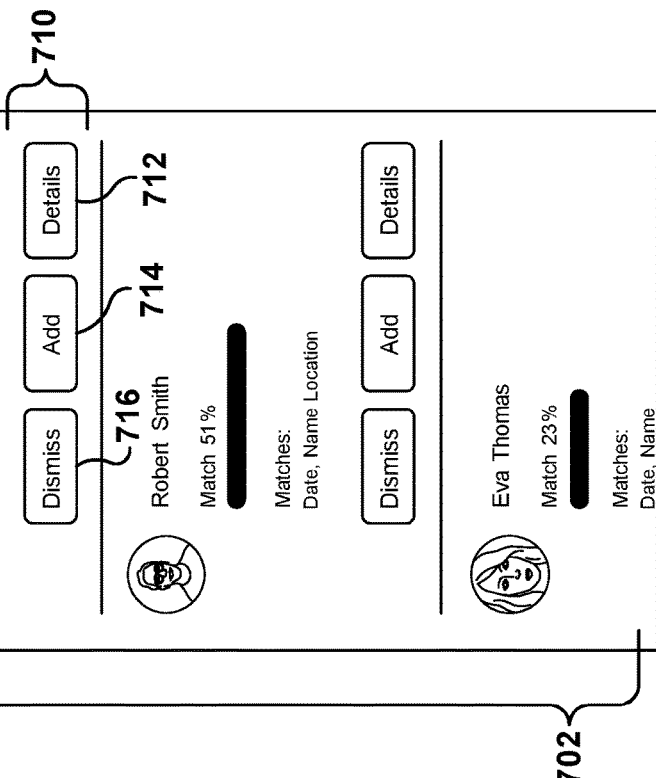
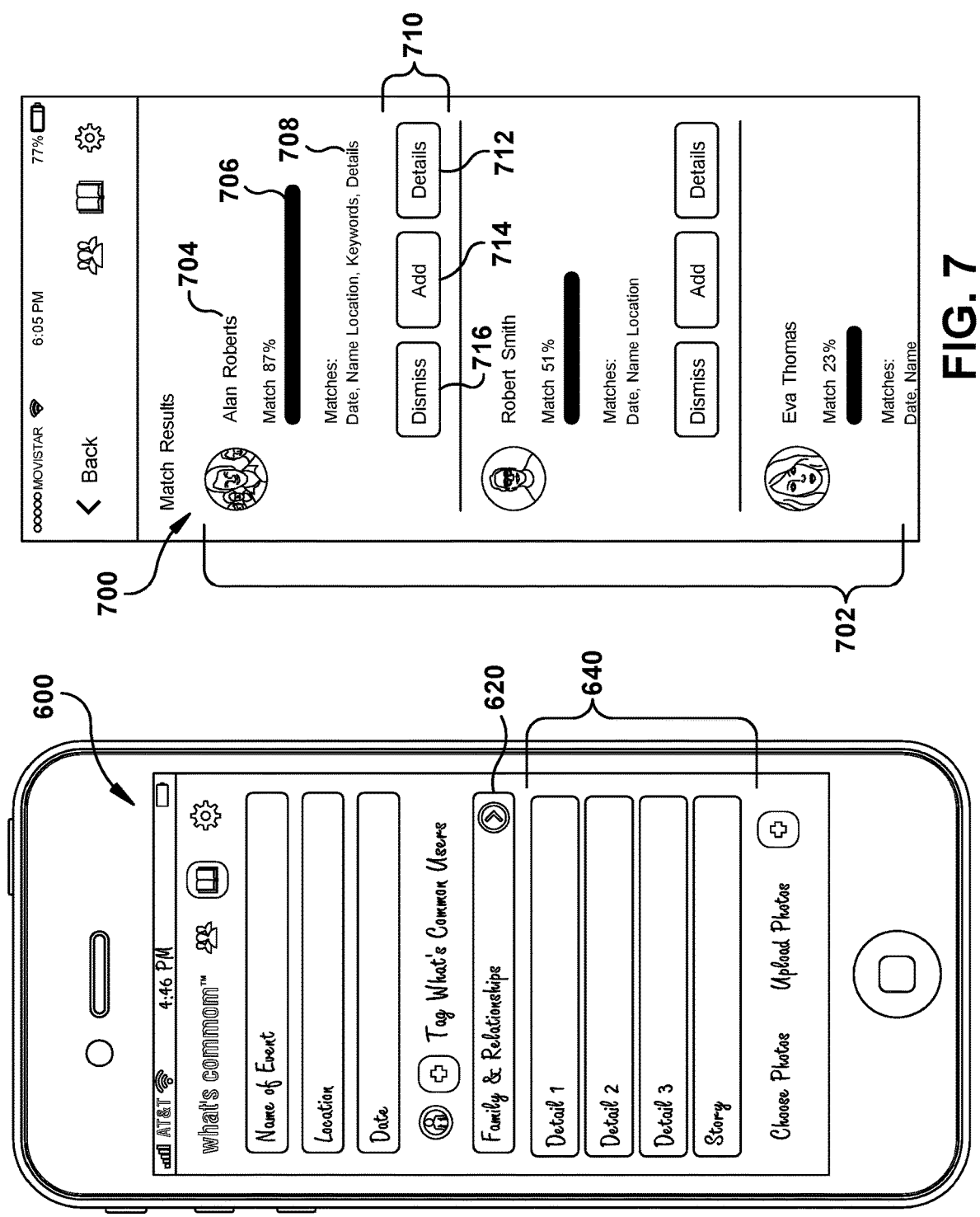
FIG. 7
FIG. 6

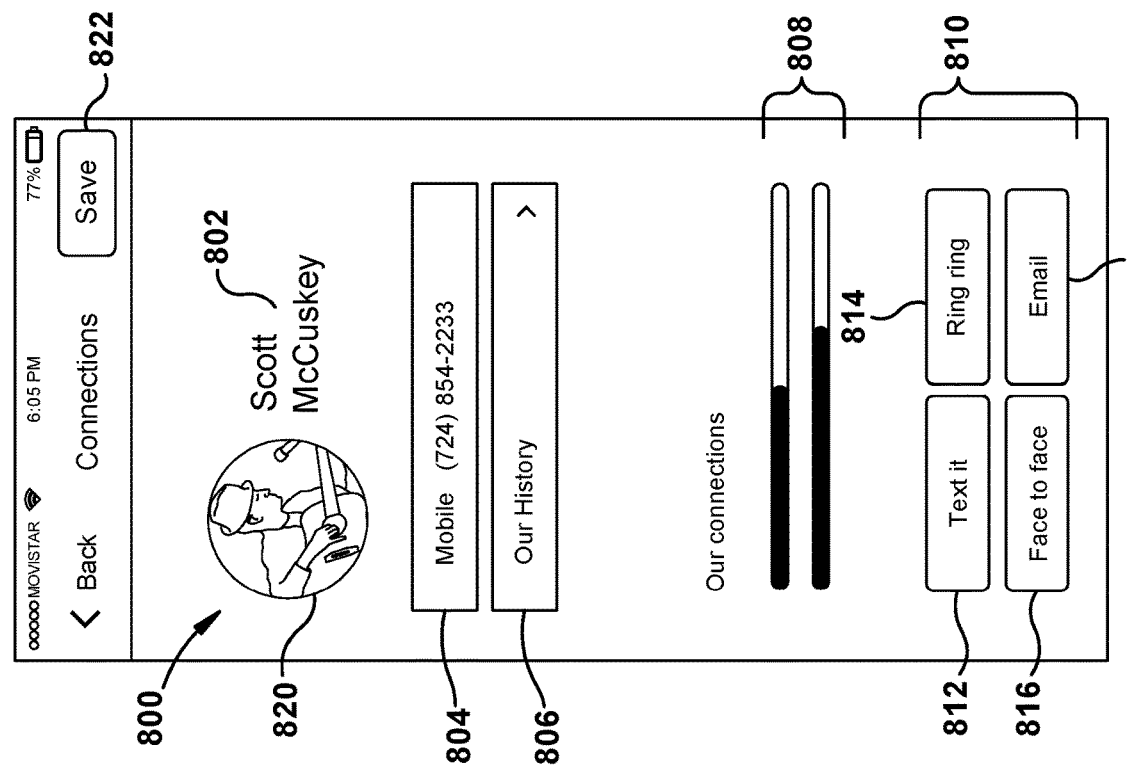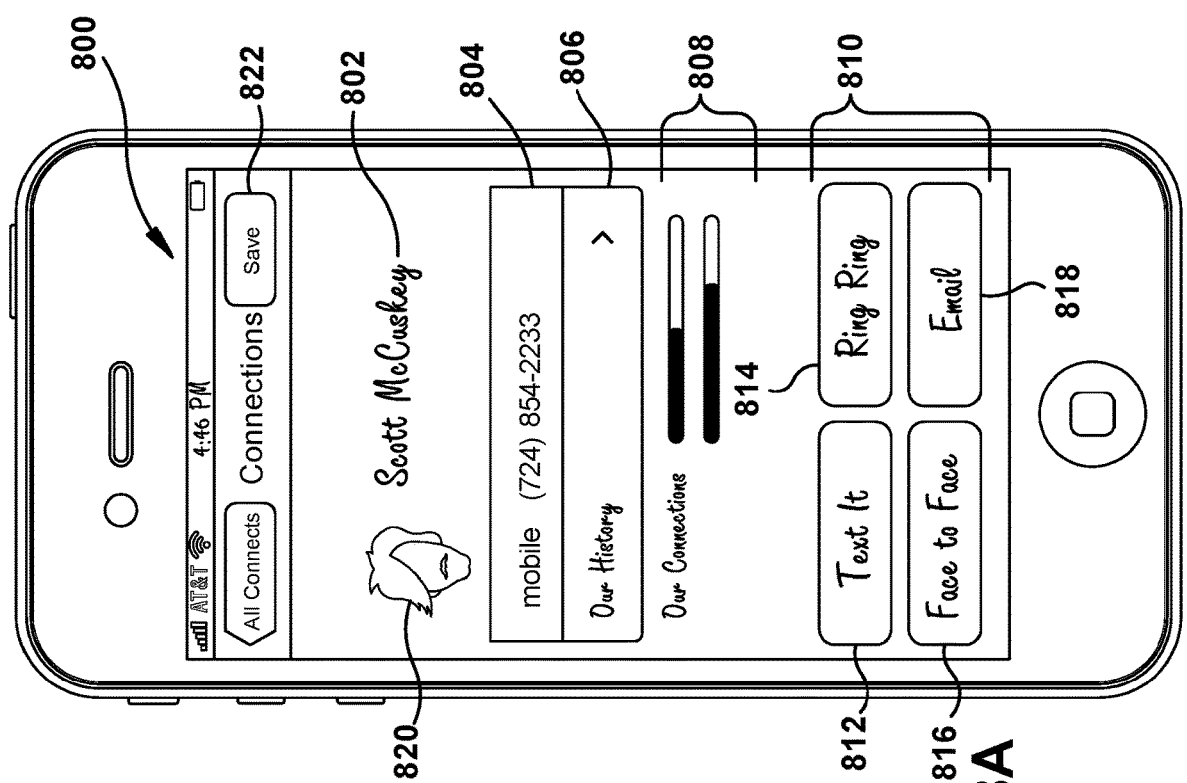

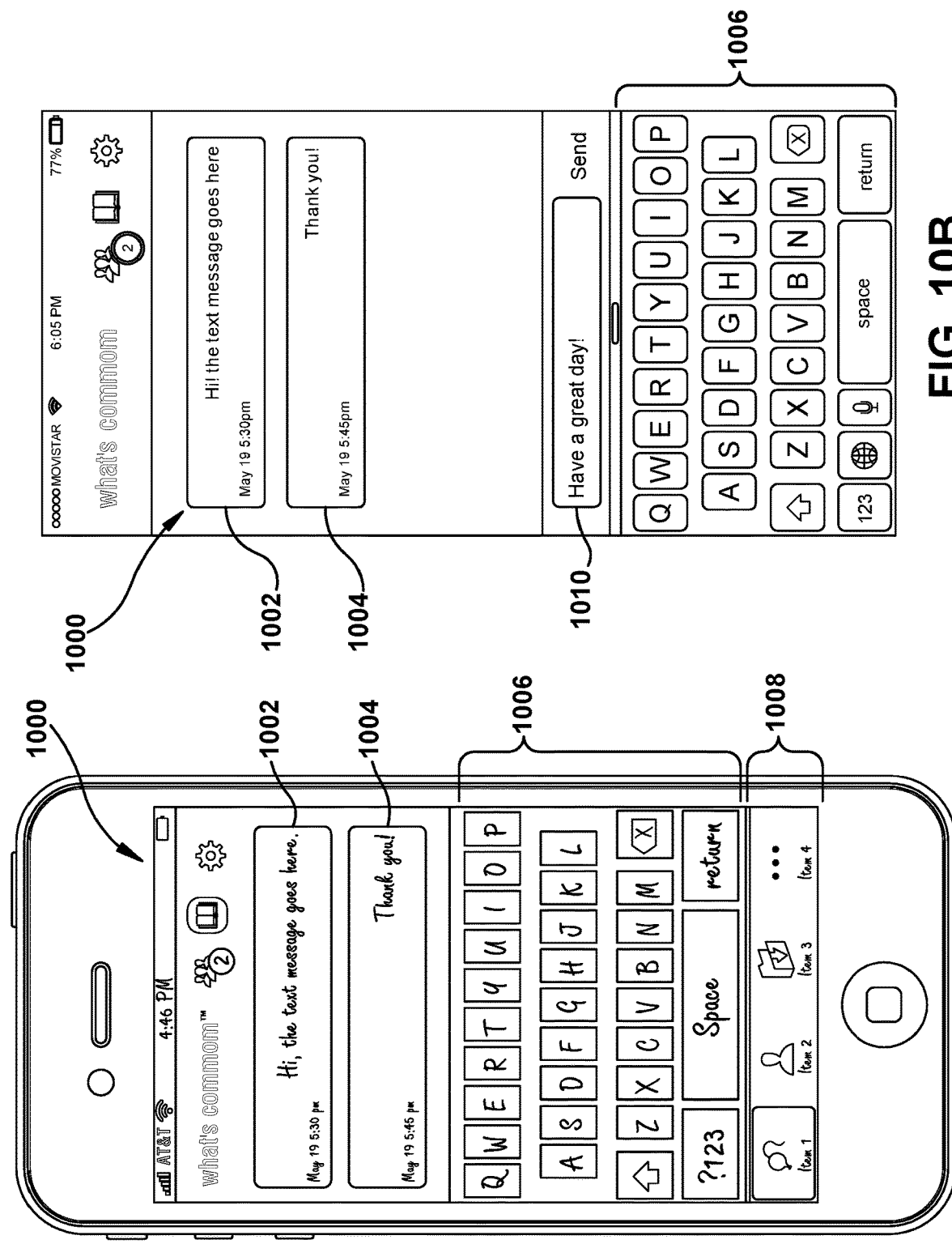

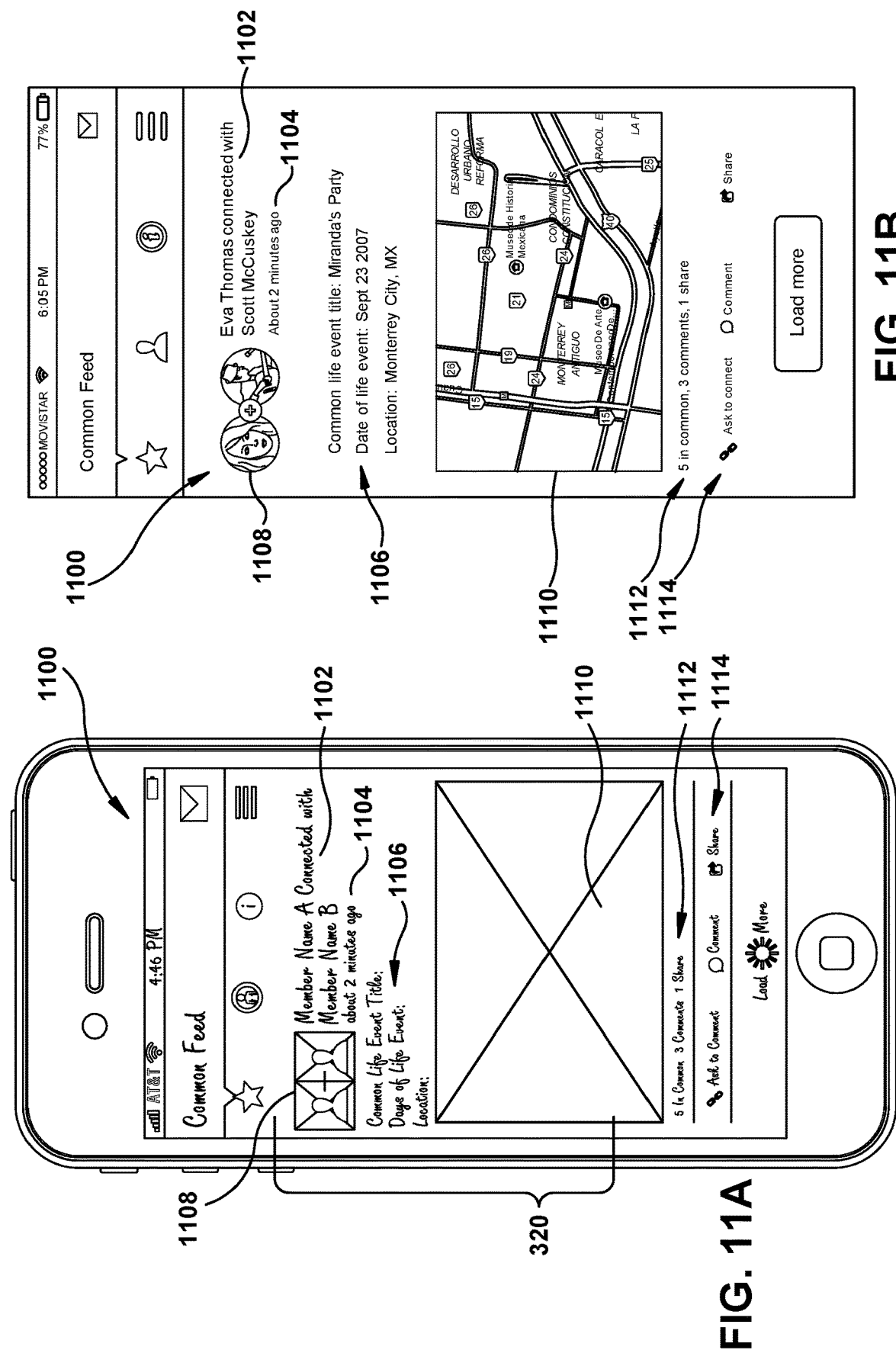

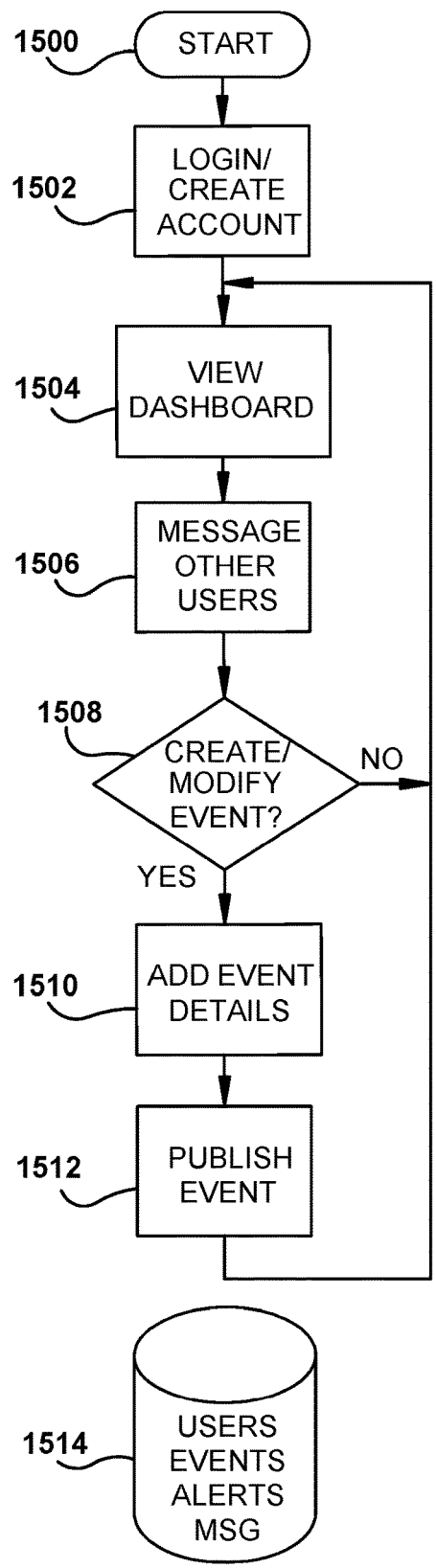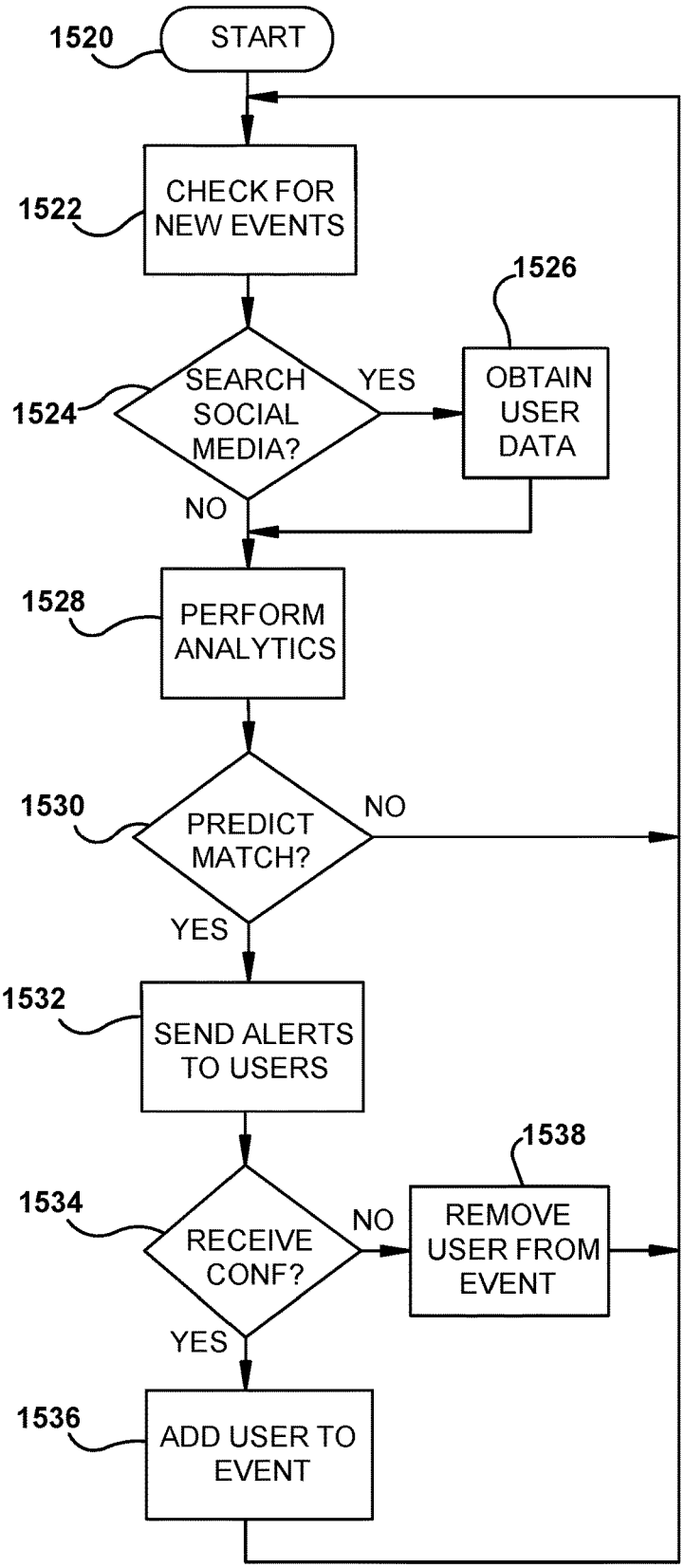
FIG. 15A
FIG. 15B

SYSTEM AND METHOD FOR EVENT-BASED SEARCHING ON SOCIAL MEDIA

CROSS-REFERENCE TO RELATED APPLICATIONS

This application is a continuation of U.S. patent application Ser. No. 16/119,042, filed Aug. 31, 2018, which claims the benefit of U.S. provisional patent application Ser. No. 62/552,950, filed Aug. 31, 2017, which are incorporated herein by reference in their entirety.

FIELD

The present application generally relates to an event-based social media search engine, and more particularly to a search engine that enables people to find one another based on events that they share in common.

BACKGROUND

Social media platforms, such as Facebook, Twitter, Instagram, Snapchat, etc. allow users to communicate or share information with one another. Using posts or directed messages, users of social media can share photos, post comments, forward articles and links to other websites, and otherwise communicate with friends, groups of individuals, or the public.

However, if a user does not know somebody's name, or specific handle, on a particular social media platform then it can be difficult, if not impossible, to find a particular person. Most, if not all, social media platforms include a search tool that allows a user to type in a person's name, or handle, and select the desired person from among the search results. However, many people have similar or identical names, so partial name searches often result in too many potential hits to be useful. The problem is further complicated when people change names or use different aliases on their social media accounts. Also, given the existence of many different kinds of social media platforms, people may only have accounts on one or a couple of social media platforms depending upon their own personal preferences. Searching multiple social media platforms requires a user to set up and maintain multiple accounts on different social media platforms and thus can be time consuming.

Further complicating the issue is that many social media platforms have privacy settings that can be configured so as to expose different amounts of personal information to different groups of people. For example, a user can have a subset of posts that are viewable by the public while other posts are viewable only by friends. People often configure their privacy settings to prevent strangers from viewing personal information, but this can also make it difficult to connect with people who are not yet "friended" by a particular person. On many platforms, friends can "follow" one another or join a common group to receive or access non-public information. However, to initially view a particular person's posts, a user still needs to able to search and find that person on a particular social media platform.

Users often become aware of one another directly by talking, or through email or messaging, or indirectly by noting a particular person's name on a post or a message of another person. In some limited circumstances, a user may be able to find people by visiting a page set up by a third party specifically to advertise or commemorate a particular event, or promote an organization or a company. The user may be able to view the handles of people following the page to find old friends or attempt to make new friends with people having similar interests. Although these kinds of pages are becoming more common, many companies, organizations, movements, and events do not have dedicated pages. This is especially true for organizations or companies that no longer exist and for events or movements that occurred in the past. Additionally, the user would still need to become aware of the existence of a dedicated page in order to identify other users.

As a result of the issues described above, it can be difficult for people to easily find and connect with other people on existing social media platforms. Therefore, there is a need for a way to search for a person other than performing name searches.

SUMMARY

In a first example embodiment, an event-based social media system includes a user interface for receiving event data from a user, a database for storing event data for multiple users, and an event matching engine for determining whether the user's event data matches any of the stored event data in the database. The user interface generates a user alert based on matching event data that is sent to users associated with the matching event data, and receives confirmation of matching event data from one or more of the users in response to the user alert. The database associates the user event data with the matching event data stored in the database. A communication server allows users with matching event data to communicate by email, text messaging, phone, video conferencing, or through an associated social media platform, for example in response to the user alert to allow users to communicate to determine whether they share a common event. The communication server can facilitate private communications between users without revealing contact information of the users to one another. Event data can include any suitable data associated with an event such as the time that the event occurred, the date or range of dates associated with the event, a place or geographic information associated with the event, photos or video associated with the event such as user photos or group photos, and names or keywords associated with an event such as a user's current or former name, nicknames, hashtags, and company or product names.

In a second example embodiment, an event-based search system includes a user interface server that receives event data about events from multiple users, a database that stores the events and event data from the users, and an analytics engine that monitors received event data and determines if the events share common event data. The user interface server generates alerts based on events that share common event data and sends those alerts to users associated with the events. The user interface server allows users to confirm events that share common event data and link the events and users associated with those events in the database. The user interface server facilitates electronic communications between users to confirm related events.

In a third example embodiment, a method of matching user-created events includes receiving first event data associated with a first user-created event from a first user, and second event data associated with a second user-created event from a second user. The method further includes determining if the first user-created event includes matching event data with the second user-created event, and sending an alert to the first user about the second user-created event based on the matching event data. The method can include receiving confirmation from the first user of a matching event and associating the second user-created event with the first user-created event in the database. The method can further include associating the second user and at least some of the second event data with the first user-created event, and adding the second user to the contact list of the first user. The method can further include facilitating communications between the first user and the second user, and publishing a user-created event and associated event data to social media.

BRIEF DESCRIPTION OF THE DRAWINGS

Various embodiments will become better understood with regard to the following descriptions, appended claims, and accompanying drawings, wherein:

FIG. 1A is a first example login screen of an embodiment of an event-based social media search platform;

FIG. 1B is a screenshot of a first example login screen of an embodiment of a social media event-based search platform;

FIG. 2A is a second example login screen of an embodiment of an event-based social media search platform;

FIG. 2B is a screenshot of a second example login screen of an embodiment of an event-based social media search platform;

FIG. 5A is a first example event detail entry screen of an embodiment of an event-based social media search platform;

FIG. 5B is a screenshot of a first example event detail entry screen of an embodiment of an event-based social media search platform;

FIG. 6 is a second example event detail entry screen of an embodiment of an event-based social media search platform;

FIG. 7 is a screenshot of an example match results screen of an embodiment of an event-based social media search platform;

FIG. 8A is a first example user contact screen of an embodiment of an event-based social media search platform;

FIG. 8B is a screenshot of a first example user contact screen of an embodiment of an event-based social media search platform;

FIG. 10A is an example messaging screen of an embodiment of an event-based social media search platform;

FIG. 10B is a screenshot of an example messaging screen of an embodiment of an event-based social media search platform;

FIG. 11A is an example connection history screen of an embodiment of an event-based social media search platform;

FIG. 11B is a screenshot of an example connection history screen of an embodiment of an event-based social media search platform;

FIG. 15A is a first flow diagram of example operations of an embodiment of an event-based social media search platform.

FIG. 15B is a second flow diagram of example operations of an embodiment of an event-based social media search platform.

DETAILED DESCRIPTION

Figure 3B:
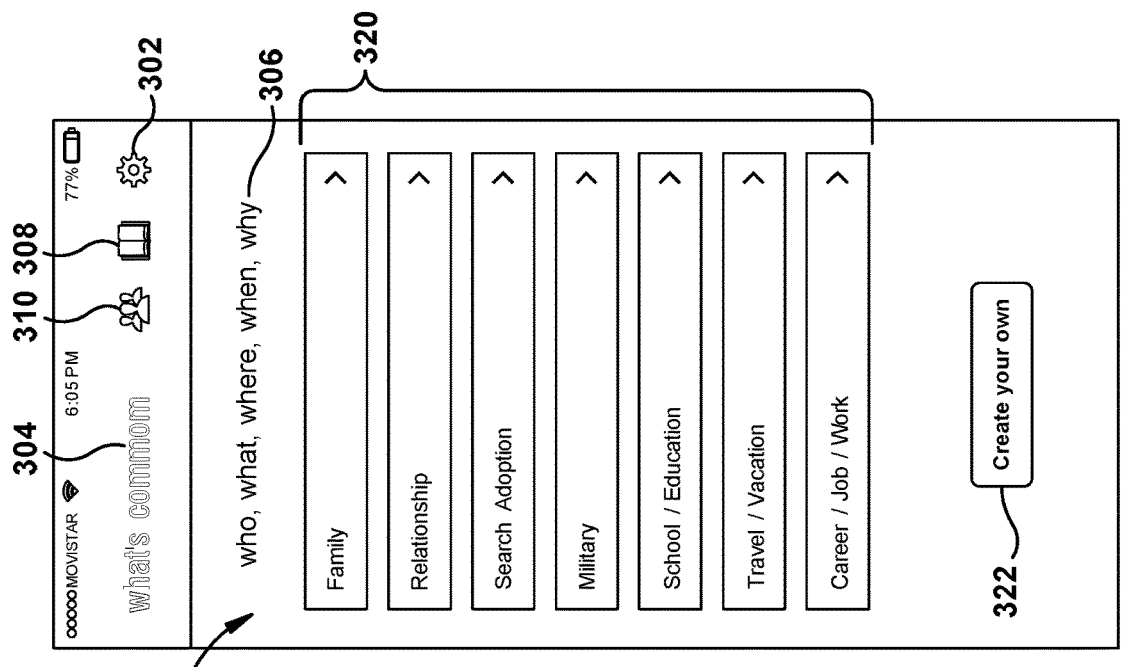
FIG. 3B is a screenshot of a first example event creation launch screen of an embodiment of an event-based social media search platform.

An event-based social media search platform can include a user interface that executes on a user's computing device, for example a mobile computing device 102 such as an IPHONE or ANDROID-based cellphone. Presented in FIGS. 1A-12B are example wireframes and example screenshots of various different pages of the user interface. As would be understood in the art, each of the pages of the user interface can be presented to the user in various ways. The wireframes and screenshots illustrate non-limiting examples of some of the possible ways that the pages can be presented to the user.

With reference to FIGS. 1A and 1B, an example embodiment of a login screen 100 for an event-based social media search platform is presented. The login screen 100 can include a logo 104, such as a trademark or other short description of the mobile app, a tag line 106, an icon 108 such as a trademark or other visual symbol that identifies the application, one or more social media logins 110, an account login 120, and a new account login 122. Social media logins 110 can include a FACEBOOK login 112, a TWITTER login 114, or a LINKEDIN login 116. The social media logins 110 allow a user to log in to the event-based social media search platform using the user's profile associated with a social media platform such as FACEBOOK, TWITTER, LINKEDIN, or other social media platforms, including but not limited to SNAPCHAT, GMAIL, and so forth. Using social media logins 110 advantageously permits a user to use an existing verified account to login rather than having to set up a new account name and password.

With reference to FIGS. 2A and 2B, a second example embodiment of a login screen 200 for an event-based social media search platform is presented. The login screen 200 can be presented on a mobile computing device 102, such as an IPHONE as described above. The login screen 200 can include a FACEBOOK login 210, an account login 220, and a new account login 222.

The event-based social media search platform can authenticate users. For example, the event-based social media search platform can require the user to select a country or region, which can be checked or verified against the user's IP address. The event-based social media search platform can use two factor authentication, such as requesting a user to enter an email address or phone number and requiring the user to respond to the email or an SMS message for example by entering a code sent in the message to the user into the event-based social media search platform. The event-based social media search platform can require the user to enter a birthdate to ensure that the user is of legal age to use the event-based social media search platform. In a configuration, a user can be required to enter a credit card or state issued identification as authentication. The user can be required to agree to terms and conditions prior to using the event-based social media search platform. The user can create a username and password for logging into the event-based social media search platform.

Once a user has established a user account, the user can be prompted by the event-based social media search platform to enter personal information such as the user's name, and a profile photo. The user can take or upload photos, tag other users in uploaded photos, authorize the event-based social media search platform to access phone contacts to see if contacts are also using the event-based social media search platform, authorize the event-based social media search platform to search the user's social media accounts such as FACEBOOK, and the event-based social media search platform can allow users to configure alerts and notification preferences. The user can be presented with a splash page or dashboard style page, that can include notifications of new connections, predicted matches with other events and users, current connections, text alerts, access to the user's photo library, as well as an option for creating a new event or adding additional details to an existing event.

Figure 3A:
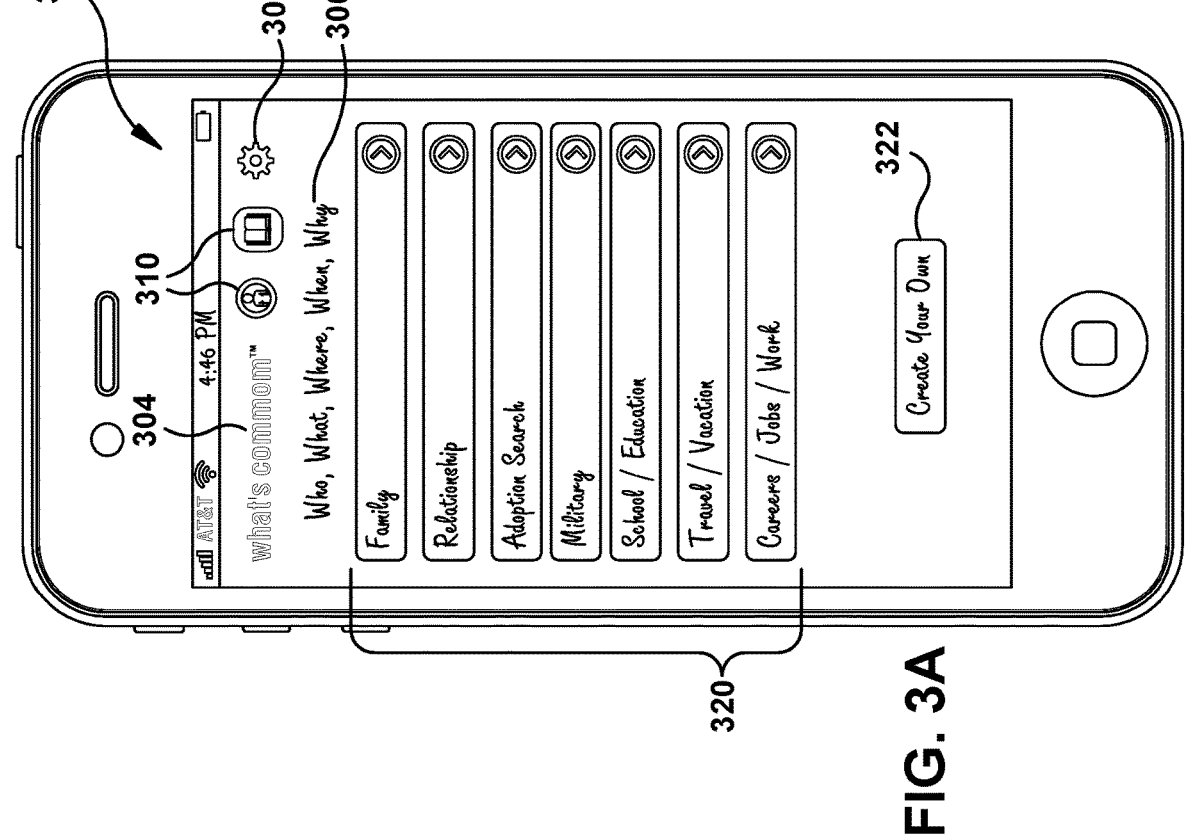
FIG. 3A is a first example event creation launch screen of an embodiment of an event-based social media search platform.

With reference to FIGS. 3A and 3B, an example embodiment of an event creation launch screen 300 for an event-based social media search platform is presented. Once a user has successfully logged in to the event-based social media search platform, the user can be presented with the event creation launch screen 300. The event creation launch screen 300 can include a logo 304, a tagline 306, a settings tool 302, an address book 308, and a connection list 310. The settings tool 302 permits a user to set preferences for the application, for example to change a password or customize aspects of the interfaces. The connection list 310 permits a user to access a list of other users with whom a connection has been established in the event-based social media search platform. The address book 308 permits a user to access their contact list, for example their list of contacts on their mobile computing device. Contacts in the user's contact list can be added to the connection list 310.

The event creation launch screen 300 also includes preset event category selections 320. Example present event categories can include, but are not limited to, a family event, a relationship type event, an adoption search event, a military event, a school or education event, a vacation or travel event, and a career event such as a job or work experience. The event creation launch screen 300 can include a create event selection 322 that allows a user to define a new kind of event. In a configuration, once created, the created events can be included in the preset event category selections 322 for future use by the user or other users. Once a user selects a preset event category, or creates an event, the user will be presented with an event detail entry screen for the selected type of event as detailed below.

Figure 4:
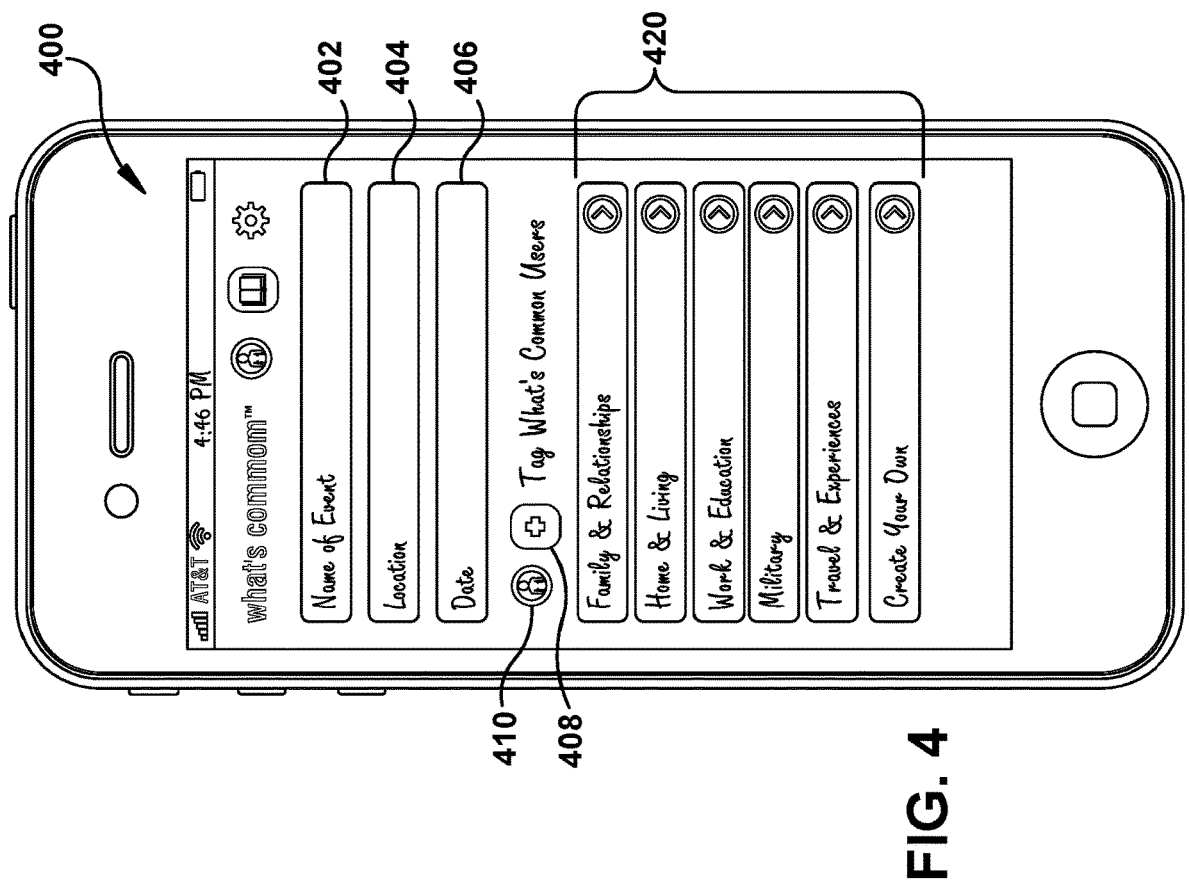
FIG. 4 is a second example event creation launch screen of an embodiment of an event-based social media search platform.

With reference to FIG. 4, a second example embodiment of an event creation launch screen 400 for an event-based social media search platform is presented. This event creation launch screen 400 is similar to the event creation launch screen 300 of FIGS. 3A and 3B, with some differences. The event creation launch screen 400 includes entry boxes for entering the name of the event 402, the location of the event 404, and the date of the event 406. A user tagging tool 408 allows a user to add other users to the event, for example by opening up the user's connection list and allowing the user to select other users to add them to the event. One or more user icons 410 can be displayed to show tagged users. The user can select the type of event from the event category list 420, which can include a selection for creating a new or customized type of event.

With reference to FIGS. 5A and 5B, an example embodiment of an event detail entry screen 500 for an event-based social media search platform is presented. The event detail entry screen 500 includes entry boxes for entering the name of the event 502, the location of the event 504, and the date of the event 506. In various configurations, the user can enter the location of the event 504 using any suitable location identifier, for example by entering a city and state, by dropping a pin on a map, by using the user's current location, by entering GPS coordinates, or by enter other identifying criteria such as a commonly known location such as a company, a place of business, a restaurant or bar, a nightclub, a military facility, a street, and so forth. In a configuration, the location can be determined by the event-based social media search platform, for example by determining the GPS coordinates associated with an entered name or other identifying information. The date of the event 506 can be a single date, a range of dates, a year, an overlapping set of years such as a school year, and so forth. The date of the event 506 can be selected using a pop-up calendar tool.

A user tagging tool 508 allows a user to add other users to the event, for example by opening up the user's connection list and allowing the user to select other users to add them to the event. One or more user icons 510 can be displayed to show tagged users. The user can select the type of event from the event category selection 520, which can include a selection for creating a new or customized type of event. Once the type of event is selected, an icon associated with the type of event can be displayed next to the name of the event 502.

The user enters keywords into the keyword entry field 530. The keywords can used by the event-based social media search platform to determine possible matches with other users. The event-based social media search platform uses the keywords, the name of the event 502, the location of the event 504, and the date of the event 506 to match the user's event with other created events in the event-based social media search platform database. Example keywords can include nicknames of people, partial names of people, names of places such as a former company name or a military base, and activities associated with the event. For example, if the user is a veteran who is attempting to make a connection with former members of her company, the user may enter keywords such as "Fort Hood, Texas", "Army", "6$^{th}$ Cav Brigade", "Alpha Troop", "Apache Training", "Staff Sergeant Slate", and so forth. Keywords advantageously allows the event-based social media search platform to determine matches based on partial lists of remembered information, rather than full, specific, and accurate information. For example, if the user attempted to find "Staff Sergeant Slate" through traditional social media, and the user searched for individuals with the last name "Slate", the user might be presented with hundreds or even thousands of possible hits. If Staff Sergeant Slate had a name change, for example through marriage to another individual and adoption of that individual's last name, it might be considerably more difficult or even impossible for the user to perform traditional searches and locate that person. For example, on Facebook, many users do not include their maiden name in their user name.

A narrative field 540 permits the user to write a summary of the event to assist other users in identifying correct matches from the possible matches presented to the user by the event-based social media search platform. A photo selection tool 550 allows the user to choose photos to add to the event, for example from the user's social media platform, such as FACEBOOK. A photo upload tool 560 allows the user to upload photos, for example from the user's photo library or by the user snapping a picture with the user's mobile computing device. A save button 570 allows the user to save or update an event. Information and details about the event can be saved both locally and uploaded to the event-based social media search platform database.

In addition to the narrative in the narrative field 540, photos allow other users to quickly identify whether or not a potential match of events is correct. Photos that include multiple people can be particularly useful, not only for helping to identify other people that could be added as keywords for an event, but also for identifying other people directly. The event-based social media search platform can use facial recognition and other image processing techniques to determine potential matches. For example, referring back to the veteran example above, a first user may create an event and include an old photo of the user in military dress. A second user may create an event that includes an old photo that includes multiple members of their squad. The event-based social media search platform can use facial recognition techniques to match the two events.

People change over time in appearance, in occupation, in geographic location, and in their associations with other people. The event-based social media search platform advantageously finds connections between users based on past information and past events, instead of using only current information, which may change over time. Users are connected based on shared past events or milestones. Referring again back to the veteran example, if a user performs a name search on a traditional social media platform in an attempt to find an old friend, the user can be presented with a list of people that happens to include the friend the user was searching for. However, the user may have difficulty identifying their friend if their friend's appearance has changed significantly over time. By encouraging users to add photos taken at the time of the event, the event-based social media search platform advantageously allows users to more readily identify one another and quickly identify events they have in common.

With reference to FIG. 6, a second example embodiment of an event detail entry screen 600 for an event-based social media search platform is presented. This event detail entry screen 500 is similar to the event detail entry screen 500 of FIGS. 5A and 5B, with some differences. The detail entry screen 600 includes one or more detail entry fields 640 for entering keywords. For example, the detail entry fields 640 can be presented based on a particular user category selection in the event category selection 620. Different entry fields 640 can be presented to the user based on different event categories. For example, for a birthday party there can be a specific field for identifying the person who is having the birthday, for example a drop down box for selecting a person from the connections list, and additional fields for entering the names of guests, gifts, hashtags, and other pertinent details.

With reference to FIG. 7, an example embodiment of an event match results screen 700 for an event-based social media search platform is presented. Each time a user adds or updates an event in the detail entry screen, the event-based social media search platform can present matches to the user on the event match results screen 700. The event match results screen 700 identifies other users associated with partially or fully matching events. An example match 702 can include the identity of the other user 704, an indication of the strength of the match 706 determined by the event-based social media search platform, and the fields 708 that either partially matched or fully matched. The user is presented with action selections 710 such as a dismiss option 712, an add option 714, and a details option 716. If the user selects the dismiss option 712, the associated match 702 is removed from the list. Typically, the user selects the dismiss option 712 to remove false positives generated by the event-based social media search platform, however a match 702 can be removed for other reasons. If the user selects the add option 714, then the user is added to the event and receives a notification described below. If the user selects the details option 716, then the user can be presented with additional information about the other user 704 before adding the user 704 or dismissing the match 702.

With reference to FIGS. 8A and 8B, an example embodiment of a user contact screen 800 for an event-based social media search platform is presented. Each user can set what information is made public and what information is kept private. For example, the user contact screen can include the name 802 of the user, a picture 820 of the user, and a phone number 804 for reaching the user, among other possible personal information. The user contact screen 800 can display one or more contact options 810 that allow a user to contact another user, for example via a text message 812, a phone call 814, FACETIME 816, and/or email 818. In a configuration, the contact options 810 can allow one user to contact another user without revealing the contact information directly. For example, a user can select the button to send a text message 812, as shown below for FIGS. 10A and 10B, without revealing the associated subscriber cell phone number. Advantageously, this feature allows users to directly communicate with one another to determine if they have a matching event without revealing private information. The user contact screen 800 can also display additional information, such as meters 808 that display the likelihood of a match. For example, one meter 808 can display the likelihood of a matching event, while another meter 808 can display a weighted match that can take into account other information such as related matches of other people that the users have in common. The user can select the history function 806 to view a screen detailing the matching event as detailed below for FIGS. 11A and 11B. A save button 822 allows the user to save the contact information. The user can also modify and save their own contact information.

Figure 9B:
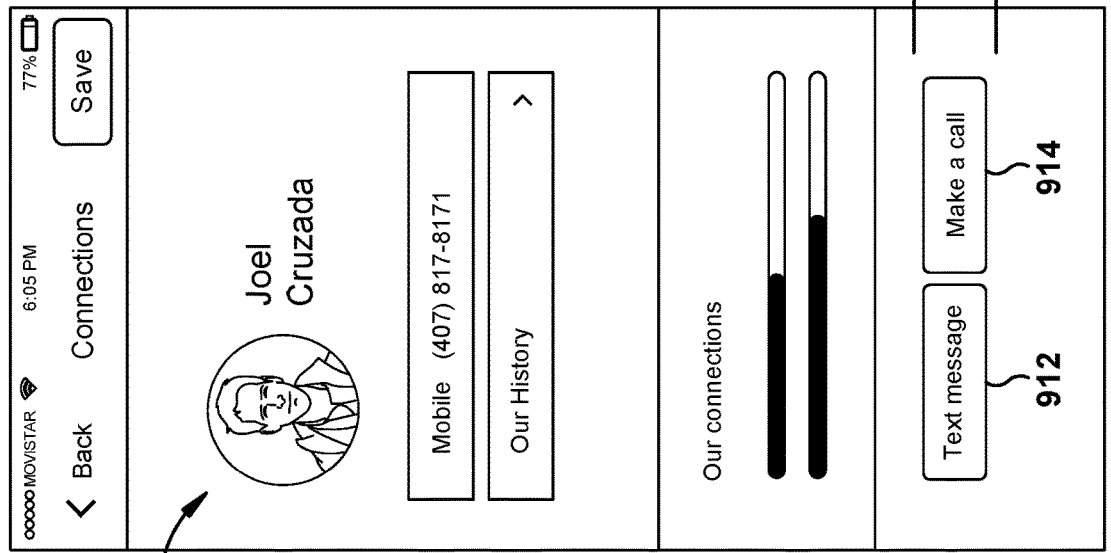
FIG. 9B is a screenshot of a second example user contact screen of an embodiment of an event-based social media search platform.
Figure 9A:
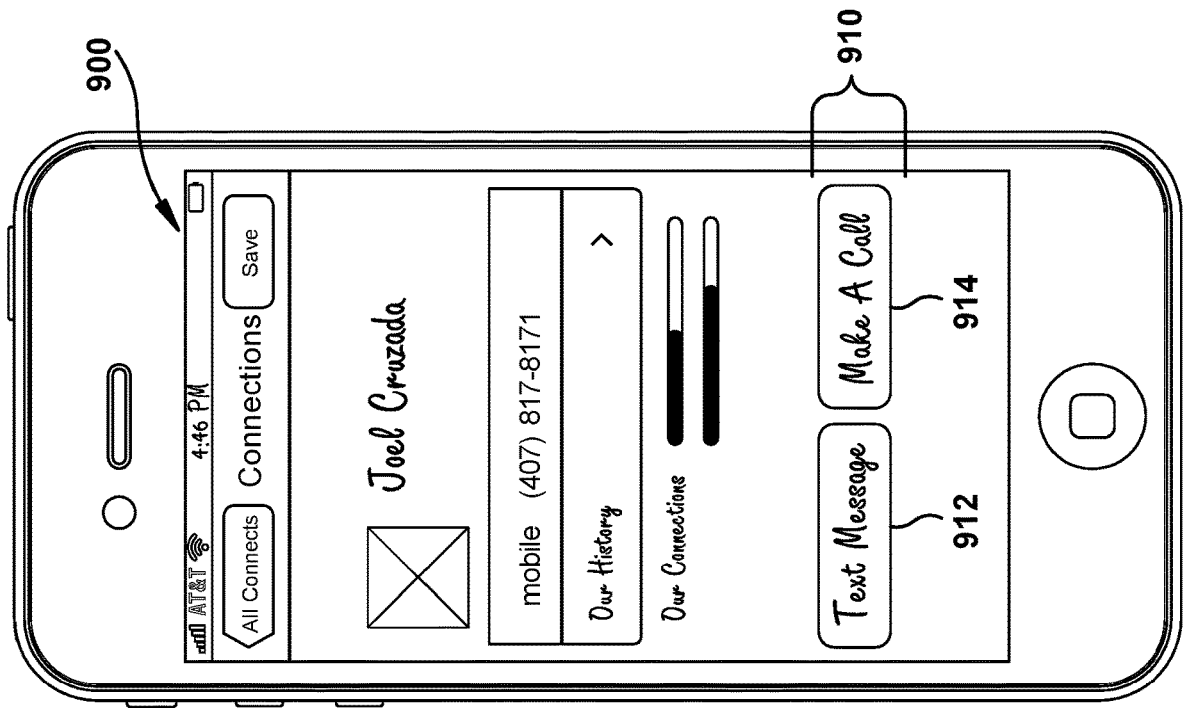
FIG. 9A is a second example user contact screen of an embodiment of an event-based social media search platform.

With reference to FIGS. 9A and 9B, a second example embodiment of a user contact screen 900 for an event-based social media search platform is presented. This user contact screen 900 is similar to the user contact screen 800 of FIGS. 8A and 8B, with some differences. The user contact screen 900 displays two contact options 810, contacting via a text message 912, or contacting via a phone call 914, based on the contact options configured by the user. Additionally, the presentation of buttons on the screen can be customized by the user or an administrator, for example to present a more traditional, professional appearance or to present a fun or trendy interface style.

With reference to FIGS. 10A and 10B, an example text messaging screen 1000 for an event-based social media search platform is presented. The text messaging screen 1000 can include one or more sent messages 1002, and one or more reply messages 1004, a keyboard 1006, a text entry field 1010, and attachment buttons 1008 for sending emoticons, contact information, photos, files, and so forth. In a configuration, the sent messages 1002 and reply messages 1004 use a common window that delineates which message is from which user.

With reference to FIGS. 11A and 11B, an example connection history screen 1100 for an event-based social media search platform is presented. The connection history screen can include a description of the parties 1102 that connected, pictures of the parties 1108, the time and date 1104 of the connection, and details 1106 about the event the parties had in common. One or more graphics 1110 can be included, such as a map of the location, a group picture, a company trademark, or other graphics as would be understood in the art. One or more status indicators 1112 can be included, for example the number of people who have the event in common, any text messages or comments between people who have the event in common, and how many other people the event was shared with. In a configuration, the user can select one of the status indicators 1112 to obtain additional information, for example by opening additional windows or using popups. For example, if the user select a status indicator 1112 associated with the number of people who have the event in common, then the user can be presented with the names of the people, either in a popup windows or by taking the user to a filtered connection list of people, as described below for FIGS. 12A and 12B. If the user selects the comments status indicator 1112, the user can view old text messages. If the user selects the share status indicator 1112, the user can view past sharing of the event with other users. A set of action buttons 1114 allows the user to perform additional actions. For example, the user can select an action button 114 to request that the user be added to the event, or send new text messages, for example in a separate text message window as described above for FIGS. 10A and 10B, or share the event with another person, for example from their connection list or contact list.

Figures 12A, 12B:
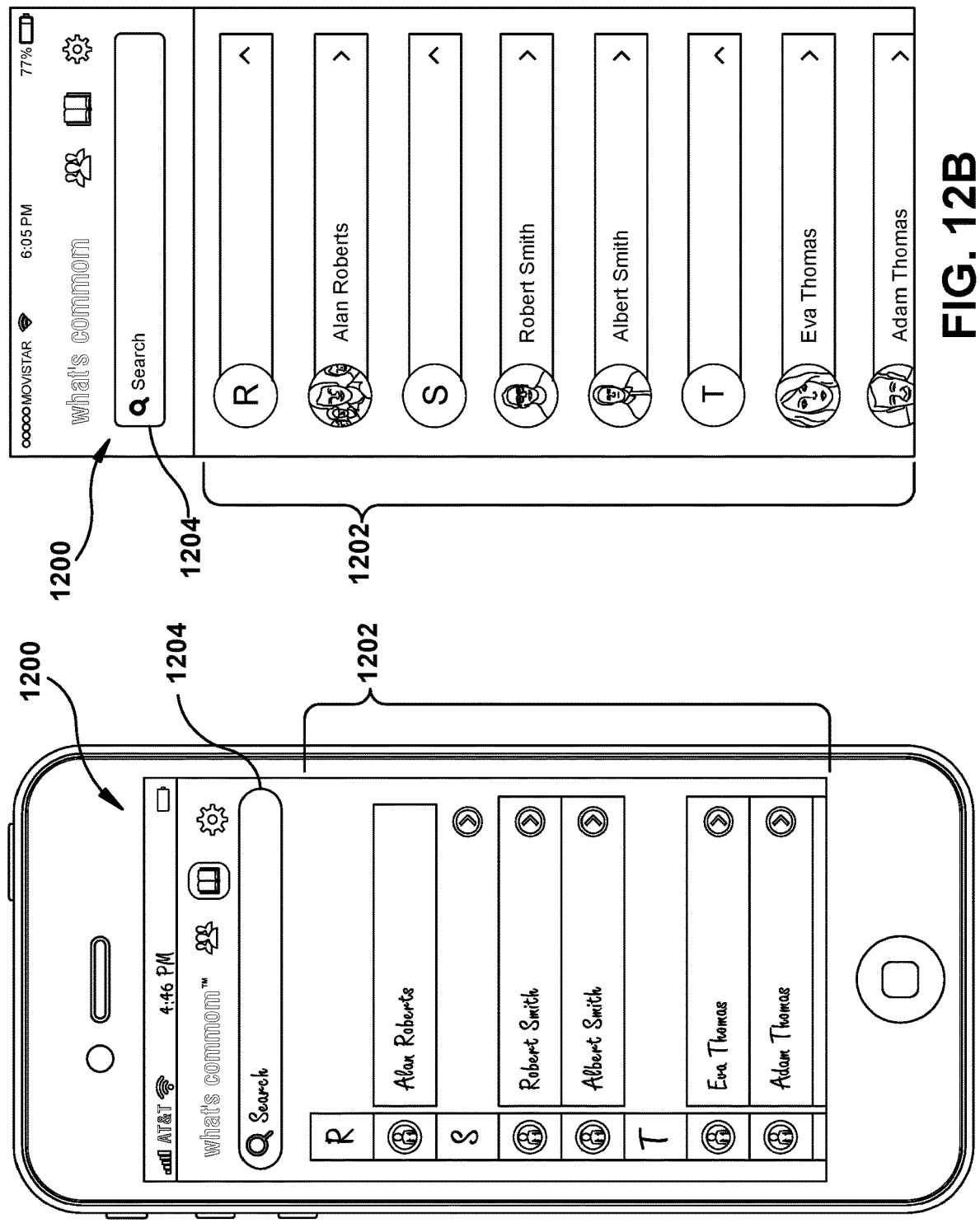
FIG. 12A is an example contact list screen of an embodiment of an event-based social media search platform.
FIG. 12B is a screenshot of an example contact list screen of an embodiment of an event-based social media search platform.

With reference to FIGS. 12A and 12B, an example contact list screen 1200 for an event-based social media search platform is presented. The contact list screen 1200 includes a list of connections, or contacts 1202. Selecting a contact allows the user to view the detailed contact information of the contact, for example as described above for FIGS. 8A and 8B. A search field 1204 allows the user to find a particular contact or filter the contacts.

Figure 13:
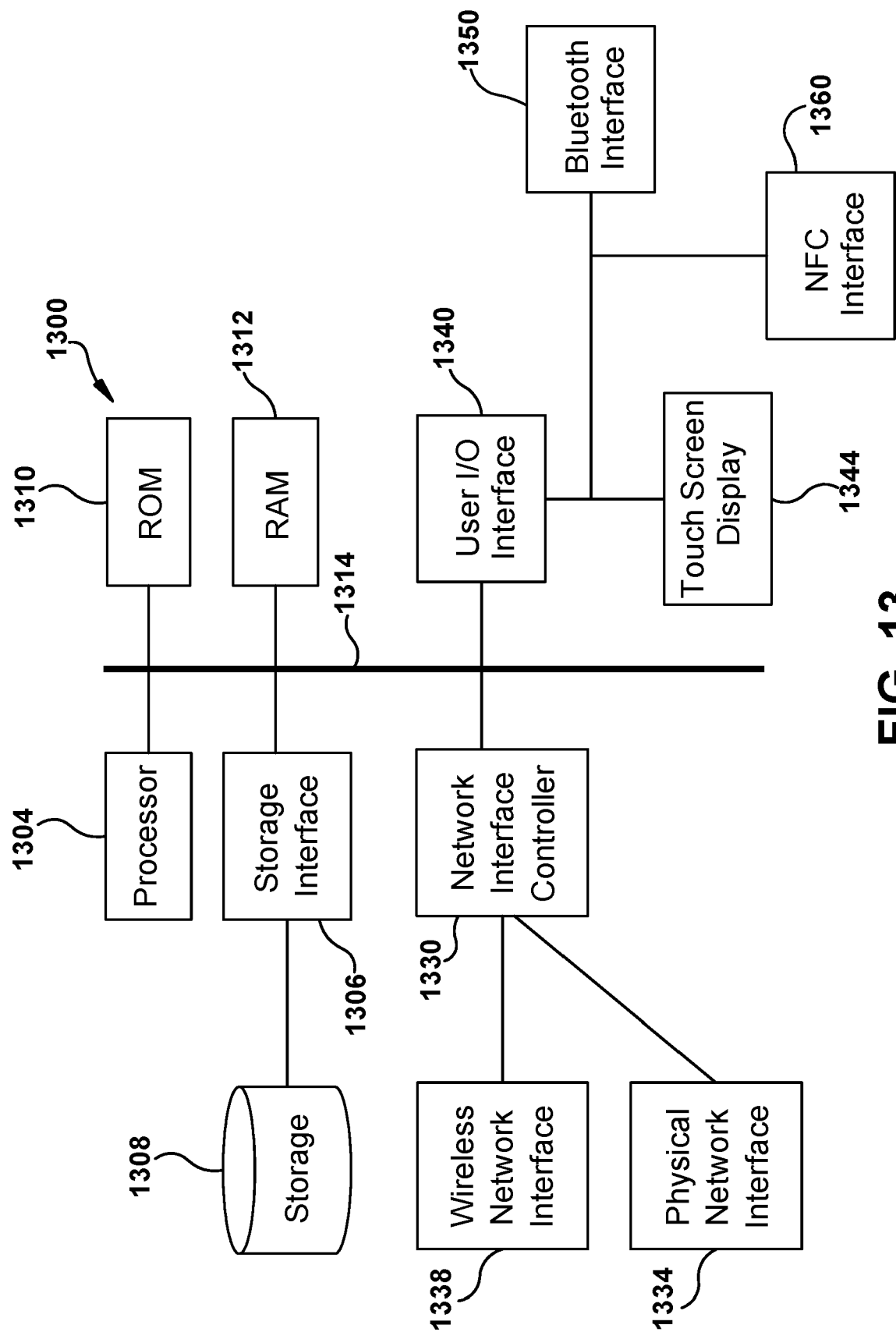
FIG. 13 is a block diagram of example components of a computing device of an embodiment of an event-based social media search platform.

With reference to FIG. 13, an event-based social media search platform can be executed on one or more computing devices 1300. For example, a user interface can execute on a user's personal computing device or mobile computing device, such as an IPHONE or ANDROID-based cellphone, while a back-end server can perform database, account management, and analytics operations. An example computing device 1300 can include one or more processors, such as that illustrated by processor 1304. Each processor is suitably associated with non-volatile memory, such as read only memory (ROM) 1310 and random access memory (RAM) 1312, via a data bus 1314. The processor 1304 is also in data communication with a storage interface 1316 for reading or writing to a data storage system 1318, suitably comprised of a hard disk, optical disk, solid-state disk, or any other suitable data storage as will be appreciated by one of ordinary skill in the art.

Processor 1304 is also in data communication with a network interface controller (NIC) 1330, which provides a data path to any suitable wired or physical network connection via physical network interface 1334, or to any suitable wireless data connection via wireless network interface 1338, such as one or more of the networks detailed above. Processor 1304 is also in data communication with a user input/output (I/O) interface 1340 which provides data communication with optional user peripherals, such as a display 1344, a keyboard 1350, a mouse 1360 or any other interface, such as track balls, touchscreens, or the like.

Figure 14:
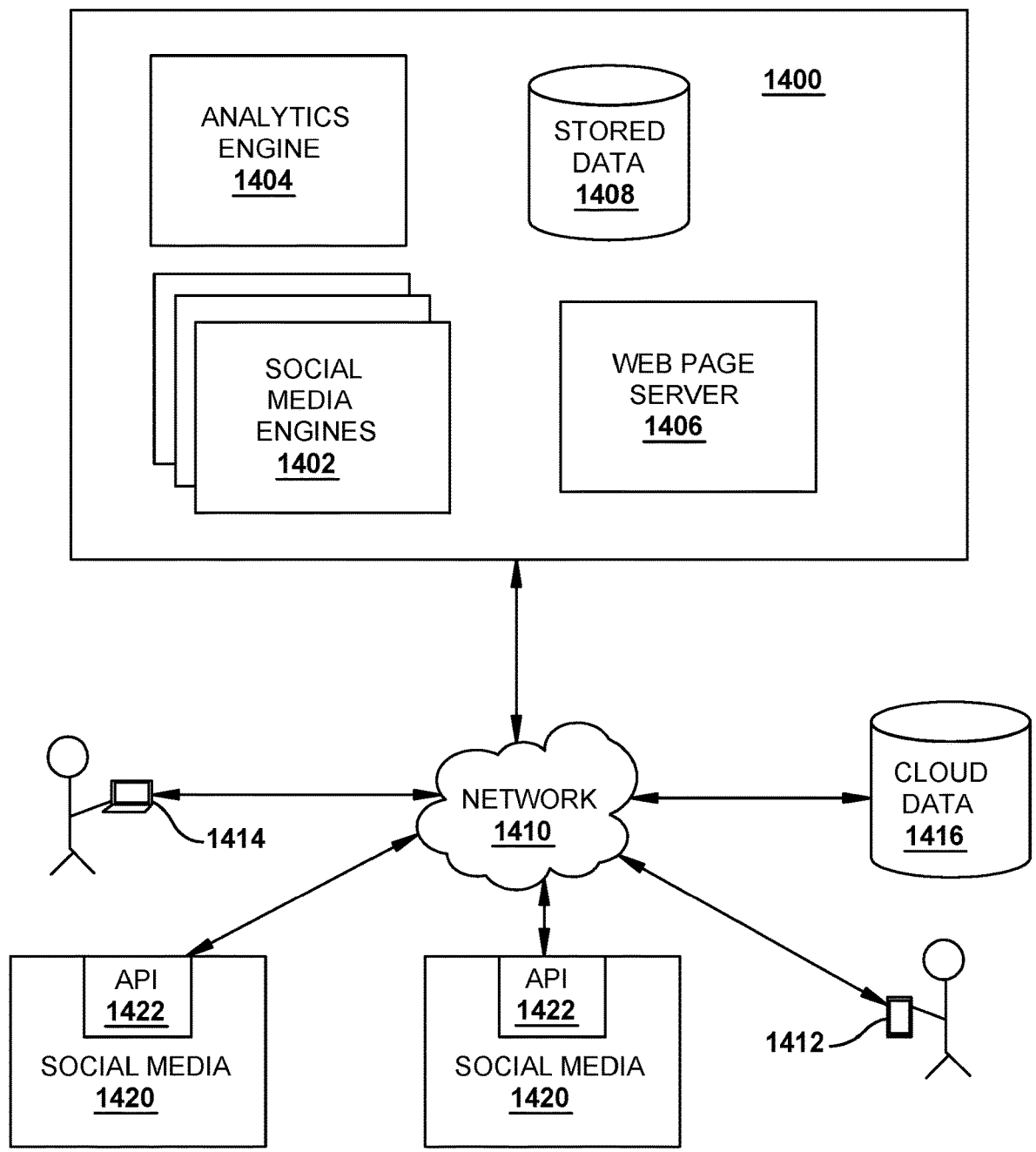
FIG. 14 is a system diagram of an embodiment of an event-based social media search platform.

With reference to FIG. 14, a system diagram of an event-based social media search platform 1400 is presented. Example software components or modules of the event-based social media search platform 1400 can include social media engines 1402, one or more analytics engine, a web page server 1406, and a database 1408 or data store, which can include cloud based storage 1416. The event-based social media search platform 1400 communicates with remote computing devices via a network 1410 such as the Internet.

In a configuration, users can access the event-based social media search platform 1400 using an application, or mobile app, that is executing on a mobile computing device 1412. In another configuration, the login screen 100 can be presented to the user through a web browser interface, for example through web pages served from the web page server 1406 to a web browser executing on a mobile computing device 1412, a tablet, a laptop, a personal computer 1414, or any other suitable computing device. In another configuration, users can execute a dedicated application that is executing on a suitable computing device such as a laptop or a personal computer 1414. In another configuration, users can access the event-based social media search platform 1400 through another social media platform 1420, such as FACEBOOK. Other types of interfaces can be used as would be understood in the art in addition to the non-limiting examples presented above.

In a configuration, the event-based social media search platform 1400 can include one or more social media support engines 1402 that each interface with an application programming interface, or API 1422, associated with a particular social media platform 1420. Each social media support engine 1402 can be configured to work with one or more APIs 1422 of the associated social media platforms 1420. In an example use of a FACEBOOK API, an event or milestone is an item that can be added to a user's FACEBOOK timeline. The user can share the event with other users, for example by adding the event to those users' respective timelines, or by forwarding the event between users using messenger-style services. In a configuration, the event can be opened by users and details can be added. For example, a picture can be added and people can be tagged in the picture.

The analytics engine 1404 of the event-based social media search platform can use algorithms, such as machine learning algorithms, to predict matches between people and events. In a configuration, the analytics engine 1404 can predict matches of two different events created by two different users. In a configuration, the analytics engine 1404 can predict a match between an event created by one user and information about another user, for example profile information or social media posts. In a configuration, the analytics engine 1404 can identify people who might belong to a particular event based on their connection to other unrelated events. The analytics engine 1404 can search data stored in the database 1408 to build expert models and then compare the expert models against both the data stored in the database 1408 and new data as it becomes available. For example, the analytics engine 1404 can receive data about newly created events, updated events, or even user interactions, such as when people are added to events, or when users send messages to other parties. In a configuration, the analytics engine 1404 can obtain information from various social media sites through associated APIs 1422, or application programming interfaces, provided by social media sites. In a configuration, the analytics engine 1404 can use publicly available information. In a configuration, the analytics engine 1404 can use private information shared by a user 1412, 1414. The expert models can be validated, curated, and fine-tuned by system administrators as would be understood in the art. Any suitable algorithms for determining matches can be implemented, including but not limited to Bayesian modeling approaches, regression analysis, heuristics, and so forth.

The analytics engine 1404 can predict a match when certain criteria or thresholds are met. For example, the analytics engine 1404 can predict a match when 30% or more event details match details associated with another event or user. Example event details can include the name of the event or milestone, the location, the date or time of the event, users tagged in the event, and keywords and other details about the event entered by users. In another example, the analytics engine 1404 can use facial recognition or other image processing to predict a match based on similarities between pictures of different events or users. The analytics engine 1404 can use multiple levels of cross checking and comparing operations before predicting a match. When a match is predicted by the analytics engine 1404, a suitable notification can be selectively sent to one or more users. For example, the user that created the event can receive a push notification that includes the exact details in common. In various configurations, the notification can be sent via the social media platform, via an email for example by including a link, or via a pop-up window in a suitable app. In another example, the other users predicted by the analytics engine 1404 can similarly receive notifications. The notifications can include options to allow a user to confirm the prediction or to indicate that the prediction was not correct.

Components and modules can be implemented in software, hardware, or a combination of software and hardware. Components and modules generally refer to items that logically can be grouped together to perform a function or group of related functions. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, web-based systems, and/or cloud-based systems, and can use other protocols, or operate at other layers in communication protocol stacks, than are described.

With reference to FIGS. 15A and 15B, example operations of an event-based social media search platform are presented. User operations commence at start block 1500 and proceed to block 1502, where a user creates a user account, or logs into an existing account, as detailed above. User account information can be added to the database 1514 or checked against an existing account in the database 1514. Processing continues to process block 1504 where the user is presented with a dashboard that allows the user to view alerts, events, and messages as described above. Processing continues to process block 1506 where the user can optionally send messages, call, or text other users, for example in response to receiving an alert about a matching event. Processing continues to decision block 1508. If a user desires to create an event, or modify an existing event, processing continues to process block 1510, otherwise processing returns to process block 1504 where the dashboard is presented to the user. In process block 1510, the user enters details about the event, which can include a name, date, location, photos, contacts, and keywords as described above. Processing continues to process block 1512 where the event is added to the database 1514 and published, for example on the user's social media page or via the event-based social media search platform. Processing then returns to the user's dashboard at process block 1504. The user can exit from event-based social media search platform at any suitable time.

Operations for event-based social media search platform commence at process block 1520 and proceed to process block 1522 where the platform checks for new events.

Processing continues to decision block 1524 where the platform can optional continue to process block 1526 to obtain user data from one or more social media platforms. Processing continues to process block 1528 where the analytics engine can perform operations to predict matches between events and users. If no new matches are predicted, then processing returns to process block 1522 to check for new events. If one or more new matches are predicted, then the match and associated users are stored in the database 1514 and processing continues to process block 1532 where alerts or notifications about the predicted match can be sent to one or more users. Processing continues to decisions block 1534 where if a user indicate that a predicted match is incorrect, then the user is removed from the event in process block 1538. If the user indicates that the predicted match is correct, then the user is added to the event and can optionally add new details to the event. Processing then continues back to process block 1522 to check for new events.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. An event-based social media system, comprising:
   a user interface configured to receive event data from a user, where the event data is associated with a specific event previously physically attended in person by the user and a plurality of other people;
   a database configured to store event data from a plurality of other users, where stored event data for each of the other users is associated with an individual event physically attended in person by at least the associated other user; and an event matching engine configured to determine if the received event data from the user for the specific event matches stored event data associated with one or more individual events from one or more of the plurality of users, wherein the user interface is further configured to:
generate a user alert based on a match of at least one instance of matching event data, wherein the user alert identifies the user and the at least one instance of matching event data, and provide the user alert to one or more other users;

when providing the user alert to one or more other users, provide:
a history button that each of the one or more other users may interact with in order to view information for a plurality of instances of matching event data between that other user and the user, wherein the plurality of instances of matching event data include the at least one instance of matching event data and at least one other instance of matching event data; and an indication of a strength of the match identified by the user alert, wherein the strength is based on a likelihood of the match;

receive a user confirmation from the one or more other users in response to the user alert, the user confirmation configured to confirm that the user and at least one of the other users physically attended in person a common event, and wherein the database is further configured, in response to the user confirmation, to associate the received event data with matching stored event data.

2. The event-based social media system of claim 1, further comprising:
a communication server configured to enable electronic communications between users, wherein the electronic communications include one or more of email, text messaging, social media communications, voice communications, and audio-video communications.

3. The event-based social media system of claim 2, wherein subsequent to receiving the user alert and prior to the sending of the user confirmation, the communication server is configured to enable private communications between users without revealing one user's contact information to another user.

4. The event-based social media system of claim 1, further comprising:
a social media application programming interface configured to publish event data via a third-party social media platform.

5. The event-based social media system of claim 4, wherein the social media application programming interface is further configured to retrieve event data from the third-party social media platform, and wherein the event matching engine is further configured to determine if the received event data from the user matches the retrieved event data from the third-party social media platform.

6. The event-based social media system of claim 1, wherein the event data includes one or more of a time, a date, a range of dates, geographic information, a map, a photo, an audio-video clip, a user, a name, a pseudonym, a maiden name, a birth name, a family identity, a company name, a trademark, a keyword, or a hashtag, and wherein the event data is associated with one or more of an adoption, a family event, a relationship event, military service, school attendance, an educational experience, a job, travel, and an entertainment event.

7. An event-based search system, comprising:
a user interface server configured to receive event data associated with a plurality of events from a plurality of users, each of the events being associated with an event previously physically attended in person by an associated user;

a database configured to store:
the events and associated event data; and
a plurality of user accounts for the plurality of users, wherein each of the plurality of user accounts is associated with a privacy setting that determines whether a set of private information of that user account is viewable by any other user account of the plurality of user accounts; and an analytics engine configured to monitor the received event data, and, for a first user of the plurality of users, determine if one or more of the plurality of events includes common event data with one or more other events for a second user of the plurality users, wherein the privacy setting for the first user is configured to only allow the second user to view the set of private information of the first user after determining that one or more of the plurality of events includes common event data between the first user and the second user, wherein the user interface server is further configured to
generate an alert that identifies the set of private information of the first user, the events and common event data, and an indication of a strength of the match identified by the alert, wherein the strength is based on a likelihood of the match, and send the alert to one or more of the users associated with the events having common event data, including at least the second user, wherein each of the plurality of events is an individual event attended by a user and a plurality of other people, and wherein the alert displays the set of private information of the first user, and requests a user to confirm if that user physically attended in person a common event also physically attended in person by another user.

8. The event-based search system of claim 7, wherein the user interface server is further configured to receive, from a user and in response to the alert, confirmation that the events include common event data, and wherein the database, in response to a received confirmation of common event data, is further configured to link the events and the users associated with the events.

9. The event-based search system of claim 7, wherein the user interface server is further configured to enable electronic communications between the users for confirming if the events are related.

10. The event-based search system of claim 7, wherein the electronic communications includes one or more of email, text messaging, voice communications, or audio-video communications between the users.

11. The event-based search system of claim 7, wherein the event data includes one or more of a time, a date, a range of dates, geographic information, a map, a photo, an audio-video clip, a user, a name, a pseudonym, a maiden name, a birth name, a family identity, a company name, a trademark, a keyword, or a hashtag.

12. A method of matching user-created events, comprising:
- receiving, from a first user, first event data associated with a first user-created event;
- receiving, from a second user, second event data associated with a second user-created event, wherein each of the first event data and the second event data comprise an event name chosen by the creating user, an event location chosen by the creating user, an event date chosen by the creating user, and a set of event keywords chosen by the creating user, and wherein:
- determining, based at least in part on the first event data and the second event data, a probability that each of the first user created event and the second user created event describe a common event previously physically attended in person by the first user and the second user, and determining, based at least in part on the probability, if the first user-created event and the second user-created event have matching event data; and
- sending, based on the matching event data, an alert to the first user about the second user-created event,
- wherein the first event data includes data identifying a first event physically attended in person by the first user, and the second event data includes data identifying a second event physically attended in person by the second user,
- wherein the alert graphically displays an indication of the probability, and requests the first user to confirm that the first event and the second event are the common event physically attended in person by the first user and the second user, and
- wherein each user-created event is associated with an individual event attended by a user and a plurality of other people.

13. The method of claim 12, further comprising:
- receiving, from the first user and in response to the alert, confirmation that the first user-created event and the second user-created event are a matching event; and
- associating, in the database, the second user-created event with the first user-created event.

14. The method of claim 13, further comprising:
- associating the second user and at least a subset of the second event data with the first user-created event.

15. The method of claim 13, further comprising:
- adding the second user to a list of contacts associated with the first user.

16. The method of claim 12, further comprising:
- facilitating communications between the first user and the second user for confirming if the first user-created event and the second user-created event are a matching event.

17. The method of claim 16, wherein communications includes one or more of email, text messaging, voice communications, and audio-video communications.

18. The method of claim 12, further comprising:
- publishing, via social media, a user-created event and at least a subset of the associated event data.

19. The method of claim 12, wherein event data includes one or more of a time, a date, a range of dates, geographic information, a map, a photo, an audio-video clip, a name, a pseudonym, a maiden name, a birth name, a family identity, a company name, a trademark, a keyword, or a hashtag.

20. The method of claim 12, wherein the user-created event is selected from the group consisting of an adoption, a family event, a relationship event, military service, school attendance, an educational experience, a job, travel, and an entertainment event.

* * * * *